(12) United States Patent
Tsutsui

(10) Patent No.: US 8,335,467 B2
(45) Date of Patent: Dec. 18, 2012

(54) RELAY METHOD AND RELAY STATION

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/725,794

(22) Filed: Mar. 17, 2010

(65) Prior Publication Data

US 2010/0248751 A1  Sep. 30, 2010

(30) Foreign Application Priority Data

Mar. 25, 2009  (JP) .................................. 2009-74350

(51) Int. Cl.
*H04B 7/14* (2006.01)

(52) U.S. Cl. .......... 455/7; 455/11.1; 455/13.1; 455/458; 370/315

(58) Field of Classification Search ............. 455/7, 11.1, 455/13.1, 13.4, 522, 69, 434, 442, 16, 515, 455/458, 15, 19, 20, 557, 556.1, 9, 67.11, 455/426, 234.1, 245.1, 250.1; 370/315, 466, 370/211, 274, 252; 340/7.21

See application file for complete search history.

(56) References Cited

U.S. PATENT DOCUMENTS

| | | | | |
|---|---|---|---|---|
| 4,941,200 A | * | 7/1990 | Leslie et al. ..................... | 455/17 |
| 5,578,803 A | * | 11/1996 | Andersson et al. ........... | 200/5 R |
| 6,404,775 B1 | * | 6/2002 | Leslie et al. ................... | 370/466 |
| 6,615,021 B1 | * | 9/2003 | Lovinggood et al. ......... | 455/11.1 |
| 6,888,881 B1 | * | 5/2005 | Nagano .......................... | 375/211 |
| 7,010,325 B1 | * | 3/2006 | Oh ................................... | 455/557 |
| 2002/0045431 A1 | * | 4/2002 | Bongfeldt .................. | 455/234.1 |
| 2002/0045461 A1 | * | 4/2002 | Bongfeldt ..................... | 455/522 |
| 2005/0118949 A1 | * | 6/2005 | Allen et al. ................... | 455/13.4 |
| 2006/0262617 A1 | * | 11/2006 | Lee ................................ | 365/203 |
| 2010/0151793 A1 | * | 6/2010 | Wang et al. ................. | 455/67.11 |

FOREIGN PATENT DOCUMENTS

JP  2006-254155  9/2006

* cited by examiner

*Primary Examiner* — Tan Trinh

(74) *Attorney, Agent, or Firm* — Katten Muchin Rosenman LLP

(57) ABSTRACT

A relay station that relays radio signals between a base transceiver station and a mobile station includes a downlink amplifier that amplifies a downlink signal from the base transceiver station to the mobile station, an uplink amplifier that amplifies an uplink signal from the mobile station to the base transceiver station, a paging response signal detection unit that detects a paging response signal with which the mobile station responds to a paging signal for paging the mobile station, and an amplification control unit that starts amplification control with respect to the downlink amplifier and the uplink amplifier when the paging response signal has been detected by the paging response signal detection unit.

11 Claims, 11 Drawing Sheets

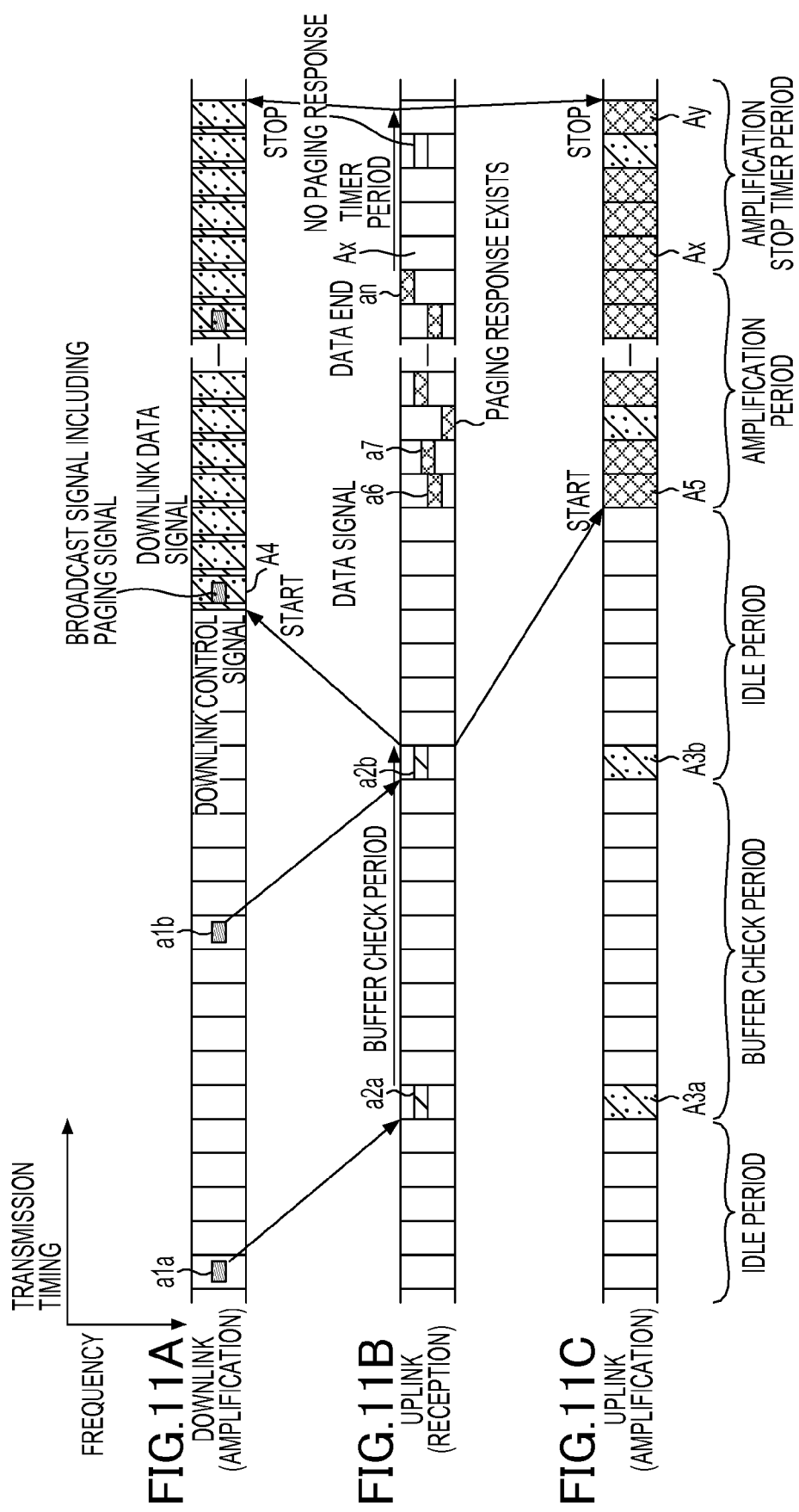

RELAY METHOD AND RELAY STATION

CROSS-REFERENCE TO RELATED APPLICATIONS

This application is based upon and claims the benefit of priority of the prior Japanese Patent Application No. 2009-74350, filed on Mar. 25, 2009, the entire contents of which are incorporated herein by reference.

FIELD

The present invention relates to a relay method and a relay station for relaying signals between a base transceiver station and a mobile station.

BACKGROUND

In mobile communications systems, there are cases where relay stations each of which wirelessly relays signals between a wireless base transceiver station and a mobile station are employed. For example, as countermeasures against dead zones, relay stations based on an RF (radio frequency) direct amplification method (also referred to as an amplify-and-forward (AF) scheme) have been put into practical use. Dead zones, in which relay stations of this type are installed, include, for example, cell edges, dense areas within each cell, underground malls, and tunnels.

Regarding a method for establishing connection between a communications apparatus and a base transceiver station by multi-hop method, there have hitherto been proposals (refer to, for example, Japanese Laid-Open Patent Publication No. 2006-254155).

Conventional relay stations perform amplification at all times even when there exists no mobile station in relay areas of the respective relay stations. This has raised problems in that the power consumption of the relay stations increases and in that a possibility of causing interferences of a cell with other cells occurs.

SUMMARY

According to an aspect of the invention, a relay station that relays radio signals between a base transceiver station and a mobile station includes a downlink amplifier that amplifies a downlink signal from the base transceiver station to the mobile station, an uplink amplifier that amplifies an uplink signal from the mobile station to the base transceiver station, a paging response signal detection unit that detects a paging response signal with which the mobile station responds to a paging signal for paging the mobile station, and an amplification control unit that starts amplification control with respect to the downlink amplifier and the uplink amplifier when the paging response signal has been detected by the paging response signal detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 11A to 11C are diagrams illustrating a third embodiment of signal timing charts during the time period from paging response detection until amplification stop.

DESCRIPTION OF EMBODIMENTS

Hereinafter, embodiments of the present invention will be described with reference to the appended drawings.

<System Block Diagram of Mobile Communications System>

Figure 1:
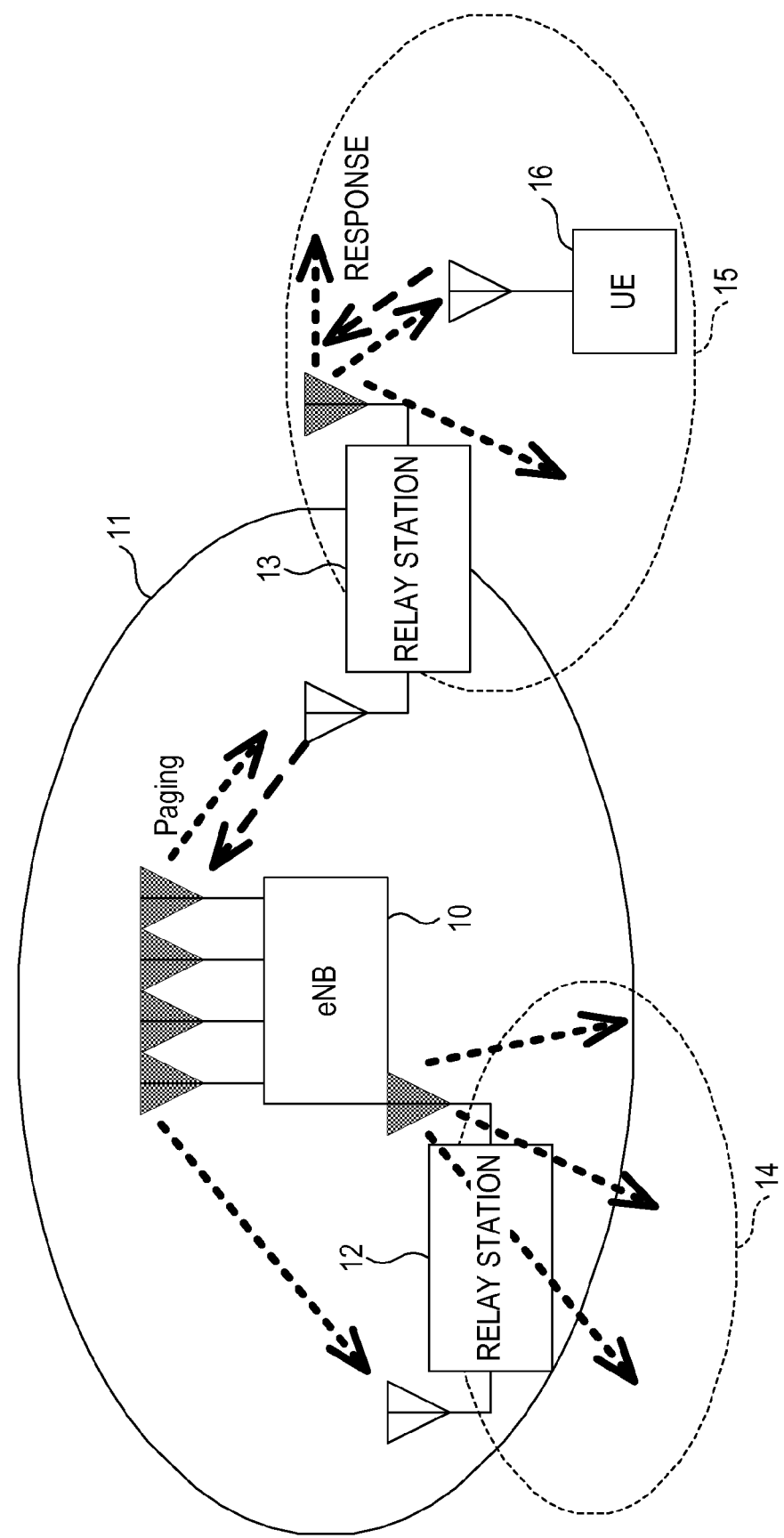
FIG. 1 is a diagram illustrating a system configuration example of an embodiment of a relay method in a mobile communications system.
Figure 2:
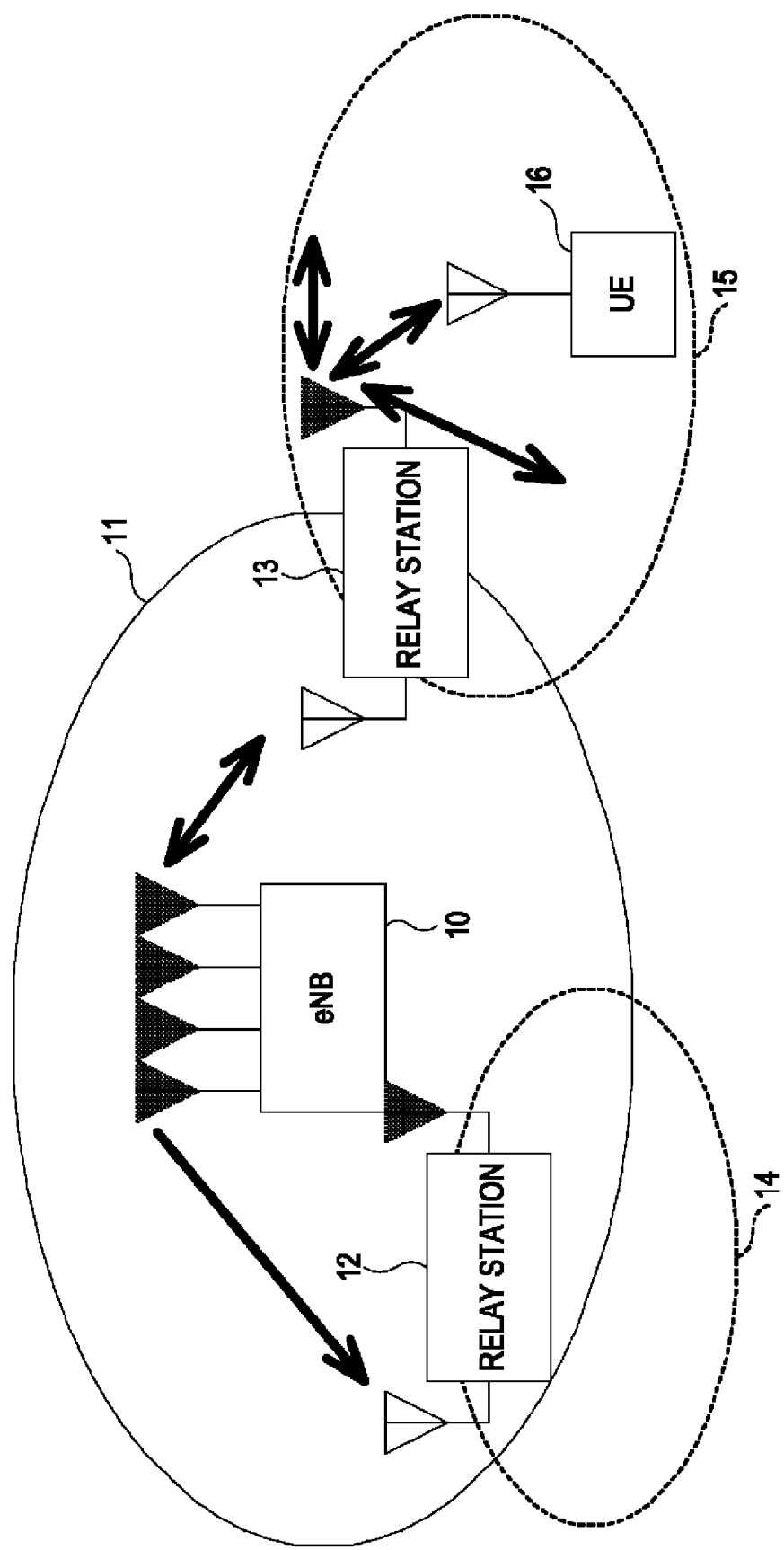
FIG. 2 is a diagram illustrating a system configuration example of an embodiment of a relay method in the mobile communications system.

FIGS. 1 and 2 each illustrate a system configuration example of an embodiment of a relay method in a mobile communications system. In this embodiment, description is made taking as an example a system performing wireless communication by long term evolution (LTE) between a wireless base transceiver station and a mobile station.

In FIG. 1, a wireless base transceiver station (also referred to as an evolved node B (eNB)) 10 performs communication upon establishing wireless connection with mobile stations (also referred to as user equipment (UE)) located within a communication range of a cell 11. In dead zones such as cell edges in the cell 11, dense areas within the cell, underground malls, and tunnels, there are provided relay stations 12 and 13. The relay stations 12 and 13, respectively, relay wireless communications between mobile stations located within communication range of relay areas 14 and 15, and the wireless base transceiver station 10 employing, for example, the RF direct amplification method. FIG. 1 depicts a case where there is no mobile station located within communication range of the relay area 14 of the relay stations 12, and a mobile station 16 exists within communication range of relay area 15 of the relay station 13.

When there is an incoming call to the mobile station 16 located within communication range of the cell 11, the wireless base transceiver station 10, as illustrated in FIG. 1, transmits a paging signal throughout the entire area of the cell 11 to perform a paging processing with respect to the mobile station 16. Here, at the timing in which the paging signal is transmitted from the wireless base transceiver station 10, each of the relay stations 12 and 13 amplifies signals with a frequency band with which at least the paging signal is transmitted, and relays the signals. Furthermore, at the timing in which a paging response signal is transmitted from the mobile station in response to the above-described paging signal, each of the relay stations 12 and 13 amplifies signals with a frequency band with which at least the paging response signal is transmitted, and relays the signals.

The mobile station 16 located within communication range of the relay area 15 of the relay station 13, upon receipt of the paging signal relayed by the relay station 13, generates and transmits the paging response signal. The pertinent paging response signal is received by the relay station 13. The relay station 13 amplifies and relays the received paging response signal. The relayed paging response signal is received by the wireless base transceiver station 10.

The relay station 13 may determine that the mobile station 16 exists within the communication range of the relay area 15 based on reception of the paging response signal. Therefore, as illustrated in FIG. 2, the relay station 13 performs amplification at timings in which subsequent data signals and control signals on uplink and downlink are transmitted.

On the other hand, the relay stations 12 may determine that no mobile station exists within the communication range of the relay area 14 based on non-reception of the paging response signal. Therefore, the relay station 12 does not perform an amplification at the timings when data signals on uplink and downlink are transmitted.

<Configuration of First Embodiment of Relay Station>

Figure 3:
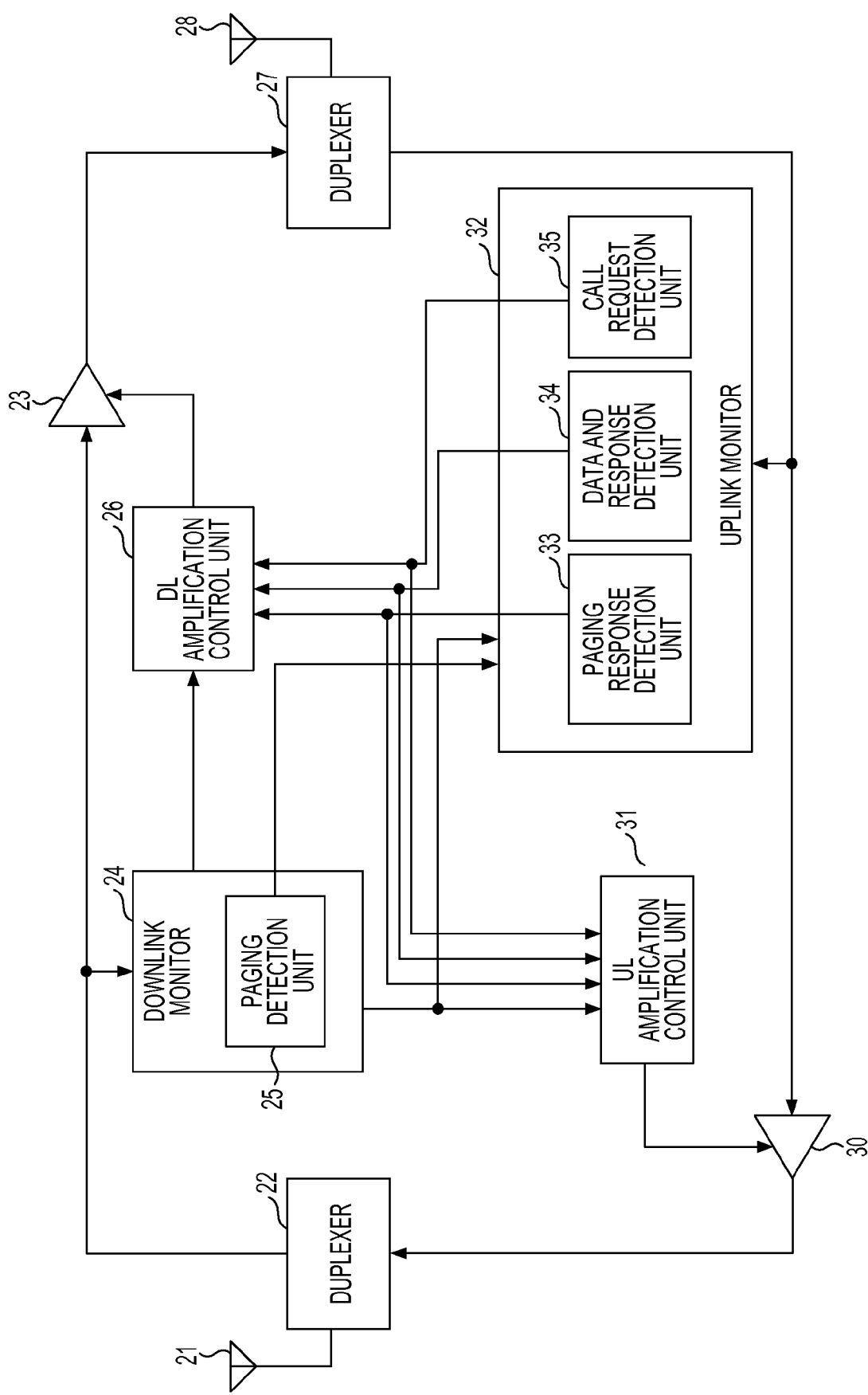
FIG. 3 is a block diagram of a first embodiment of a relay station.

FIG. 3 is a block diagram of a first embodiment of a relay station. In FIG. 3, downlink signals from the wireless base transceiver station 10, received by an antenna 21, are supplied to a downlink amplifier 23 and a downlink monitor 24 through a duplexer 22.

The downlink monitor 24 monitors and decodes the downlink signals. Thereby, the downlink monitor 24 recognizes the timing of receiving a broadcast signal including a paging signal and the timing of receiving a paging response signal. The timing (sub-frame position) during which the broadcast signal in downlink signals exists is determined in advance. The broadcast signal includes instructions of the timing (sub-frame position) of transmitting the downlink data signal, the timing (sub-frame position) for the mobile station to transmit the paging response signal, and the timing (sub-frame position) for the mobile station to transmit a data signal or a data reception response signal, such as ACK/NACK, on uplink.

The downlink monitor 24 notifies a downlink (DL) amplification control unit 26 of the timing of receiving the broadcast signal including the paging signal, and notifies an uplink (UL) amplification control unit 31 and an uplink monitor 32 of the timing of receiving the paging response signal.

The downlink monitor 24 includes a paging detection unit 25. The paging detection unit 25 detects the paging signal included in the broadcast signal, and notifies the uplink monitor 32 of the detection of the paging signal. Moreover, when the paging signal has been detected, the paging detection unit 25 may extract, from the paging signal, an identifier of a mobile station paged by the pertinent paging signal, and may notify the uplink monitor 32 of the identifier.

The downlink amplifier 23 is placed under the control of a DL amplification control unit 26, and amplifies downlink signals by the RF direct amplification method. The downlink signals having been amplified in the downlink amplifier 23 are transmitted from an antenna 28 through a duplexer 27.

The DL amplification control unit 26 causes the downlink amplifier 23 to perform an amplification at a timing of receiving the broadcast signal including the paging signal. The DL amplification control unit 26, upon receipt of a notification of paging response detection to be described later, causes the downlink amplifier 23 to start an amplification at a timing of receiving a subsequent data signal on downlink, and upon receipt of a notification of data detection completion to be described later, causes the downlink amplifier 23 to finish the amplification.

Furthermore, the DL amplification control unit 26, upon receipt of a notification of call request detection to be described later, causes the downlink amplifier 23 to start an amplification at the timing of receiving a subsequent downlink data signal, and upon receipt of a notification of data detection completion to be described later, causes the downlink amplifier 23 to finish the amplification.

Uplink signals from the mobile station, received by the antenna 28, are supplied to an uplink amplifier 30 and the uplink monitor 32 through the duplexer 27.

The uplink monitor 32 monitors and decodes uplink signals. The uplink monitor 32 includes a paging response detection unit 33, a data and response detection unit 34, and a call request detection unit 35.

The paging response detection unit 33, upon receipt of a notification of the detection of the paging signal from the paging detection unit 25, detects the paging response signal at a timing of receiving the paging response signal on uplink. When the paging response signal has been detected, the paging response detection unit 33 may extract, from the paging response signal, the identifier of a mobile station that transmitted the pertinent paging response signal. The paging response detection unit 33 notifies the DL amplification control unit 26 and the UL amplification control unit 31 of the paging response detection.

Here, the paging response detection unit 33 may be configured to perform paging response detection when the identifier of a mobile station paged by the paging signal notified by the paging detection unit 25 coincides with the identifier of the mobile station that transmitted the above-described paging response signal. This prevents the paging response from being mis-detected.

The data and response detection unit 34 detects a data signal and/or a data reception response signal, such as ACK/NACK, on uplink. When the data signal and/or the ACK/NACK are no longer detected, the data and response detection unit 34 notifies the DL amplification control unit 26 and the UL amplification control unit 31 of data detection completion.

The call request detection unit 35 detects a call request using a random access channel (RACH) from a mobile station, and notifies the DL amplification control unit 26 and the UL amplification control unit 31 of the call request detection.

The uplink amplifier 30 is placed under the control of the UL amplification control unit 31, and amplifies uplink signals by the RF direct amplification method. The uplink signals having been amplified in the downlink amplifier 23 are transmitted from the antenna 21 through the duplexer 22.

The UL amplification control unit 31 causes the uplink amplifier 30 to perform an amplification at the timing of receiving the paging response signal. The UL amplification control unit 31, upon receipt of a notification of paging response detection, causes the uplink amplifier 30 to start an amplification at the timing of receiving a subsequent data signal on uplink, and upon receipt of a notification of data detection completion, causes the uplink amplifier 30 to finish the amplification.

Furthermore, the UL amplification control unit 31, upon receipt of a notification of call request detection, causes the uplink amplifier 30 to start an amplification at the timing of receiving a subsequent uplink data signal, and upon receipt of a notification of data detection completion, causes the uplink amplifier 30 to finish the amplification.

<Signal Timing Chart During Paging Response Detection>

Figure 4:
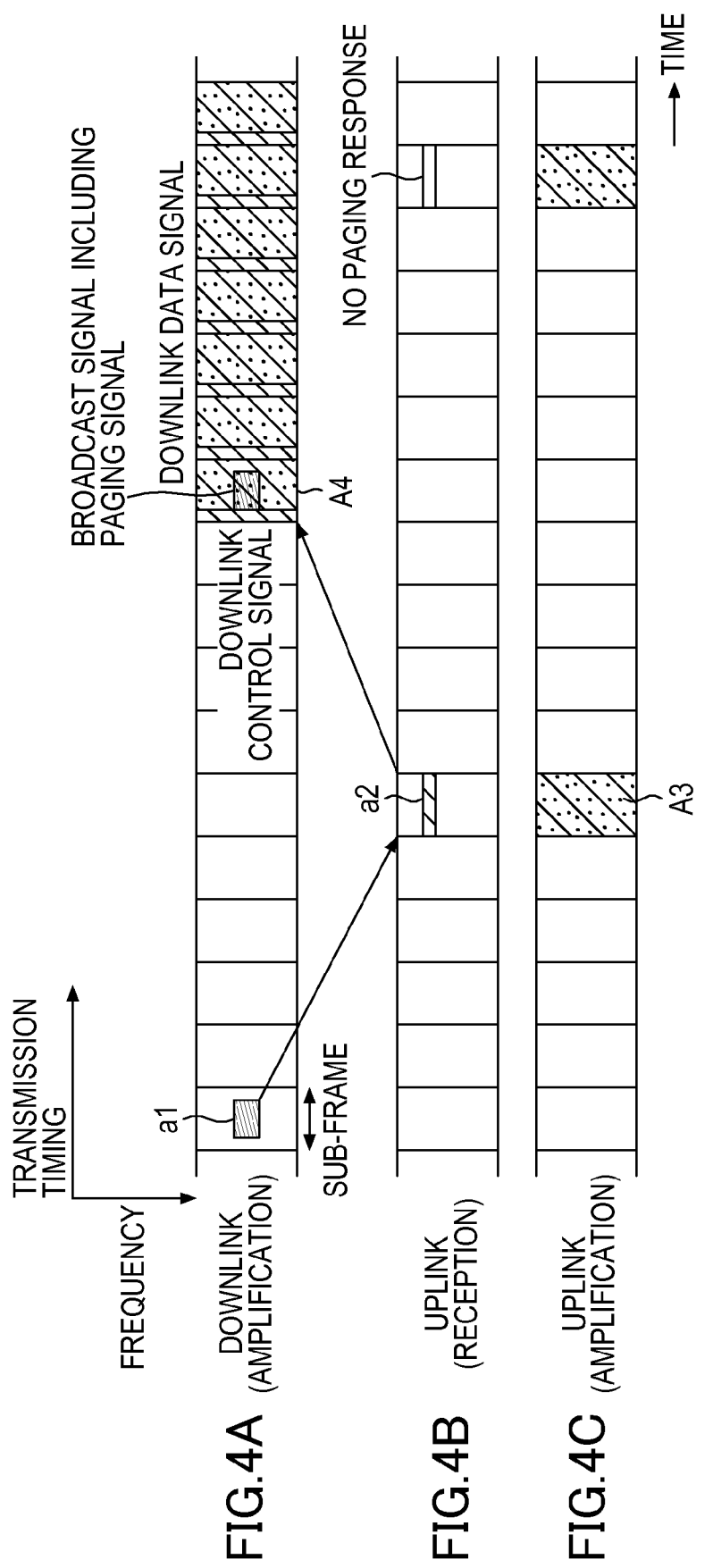
FIGS. 4A to 4C are diagrams illustrating a first embodiment of signal timing charts at the time when a paging response is detected.

FIGS. 4A to 4C illustrate a first embodiment of signal timing charts at the time when a paging response is detected. FIG. 4A depicts a state where amplification is performed on downlink, FIG. 4B depicts a state where reception is performed on uplink, and FIG. 4C depicts a state where amplification is performed on uplink. In FIGS. 4A to 4C, the horizontal axis represents time, and the vertical axis represents frequency. On downlink and uplink, each block represents a sub-frame (1 msec) of LTE, with 10 sub-frames making up a frame. Each sub-frame on downlink includes a control signal in the head portion and a data signal following the control signal.

A broadcast signal a1 including a paging signal (indicated by hatching in FIG. 4A) is received by the relay station. In response to this, a paging response signal a2 (indicated by hatching in FIG. 4B) is received by the relay station. In the relay station, a sub-frame A3 (indicated by hatching in FIG. 4C), at the timing of receiving the above-described paging response signal a2, is amplified by the uplink amplifier 30.

In FIG. 4C, amplification is performed over all frequency bands on the assumption that frequency resources for the paging response signal a2 to be received may be unspecified. However, if the frequency resources for the paging response signal a2 have been specified from the received broadcast signal a1, the uplink amplifier 30 may be configured to amplify a specified frequency.

In response to the reception of the paging response signal a2, the downlink amplifier 23 starts an amplification from a sub-frame A4 (indicated by hatching in FIG. 4A) at the timing of receiving a subsequent downlink data signal.

<Signal Timing Chart During Paging Response Non-Detection>

Figure 5:
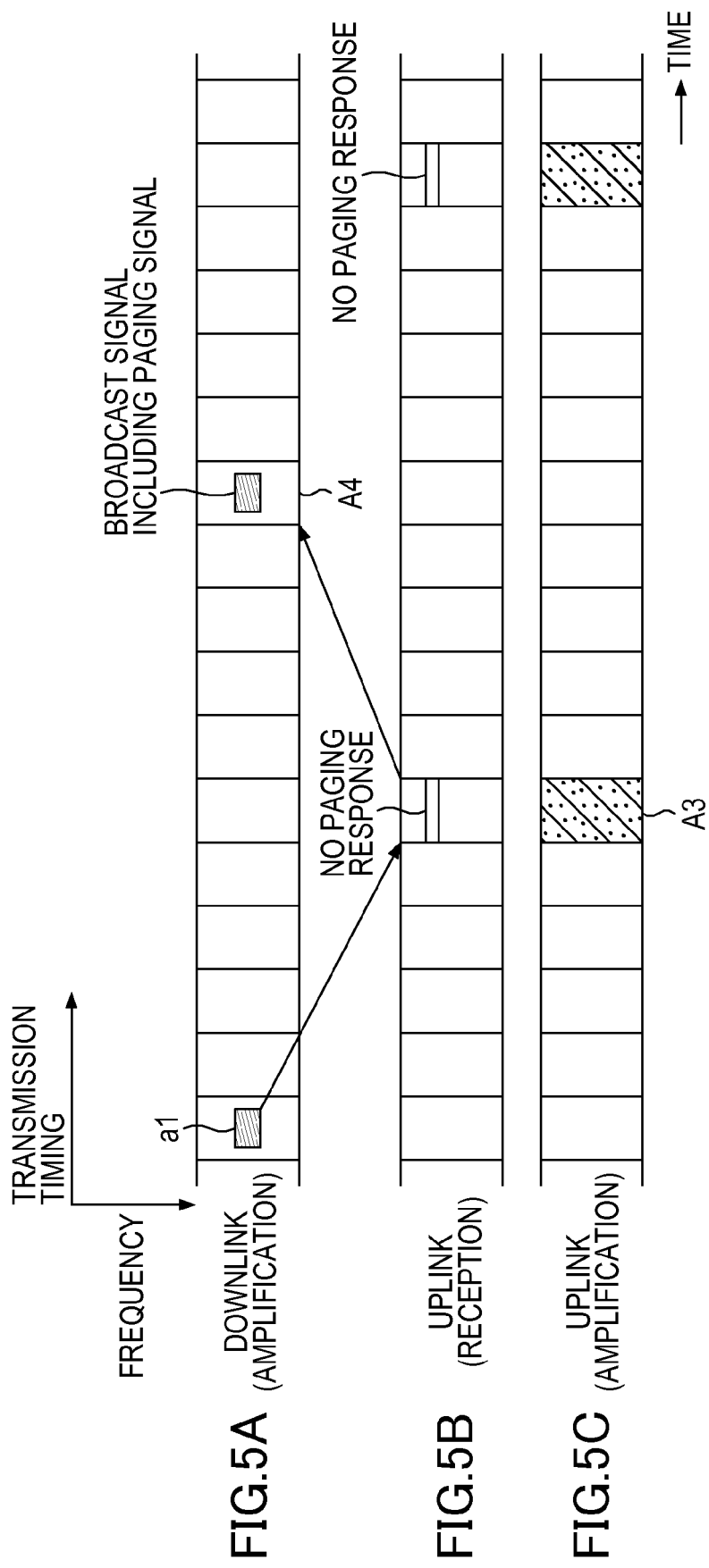
FIGS. 5A to 5C are diagrams illustrating the first embodiment of signal timing charts at the time when no paging response is detected.

FIGS. 5A to 5C each illustrate the first embodiment of signal timing charts at the time when no paging response is detected. FIG. 5A depicts a state where amplification is performed on downlink, FIG. 5B depicts a state where reception is performed on uplink, and FIG. 5C depicts a state where amplification is performed on uplink.

A broadcast signal a1 including a paging signal (indicated by hatching in FIG. 5A) is received by the relay station. As illustrated in FIG. 5B, no paging response signal corresponding to the paging signal is received by the relay station. In the relay station, a sub-frame A3 (indicated by hatching in FIG. 5C), at the timing in which the above-described paging response signal is to be received, is amplified by the uplink amplifier 30.

Since no paging response signal is received, as illustrated in FIG. 5A, the downlink amplifier 23 does not perform an amplification with respect to a sub-frame A4 at the timing of receiving a subsequent downlink data signal. Furthermore, as illustrated in FIG. 5C, the uplink amplifier 30 performs no amplification with respect to sub-frames when a subsequent uplink data signal is to be received. This allows a reduction in power consumption of the downlink amplifier 23 and the uplink amplifier 30.

<Signal Timing Chart from Paging Response Detection Until Amplification Stop>

Figure 6:
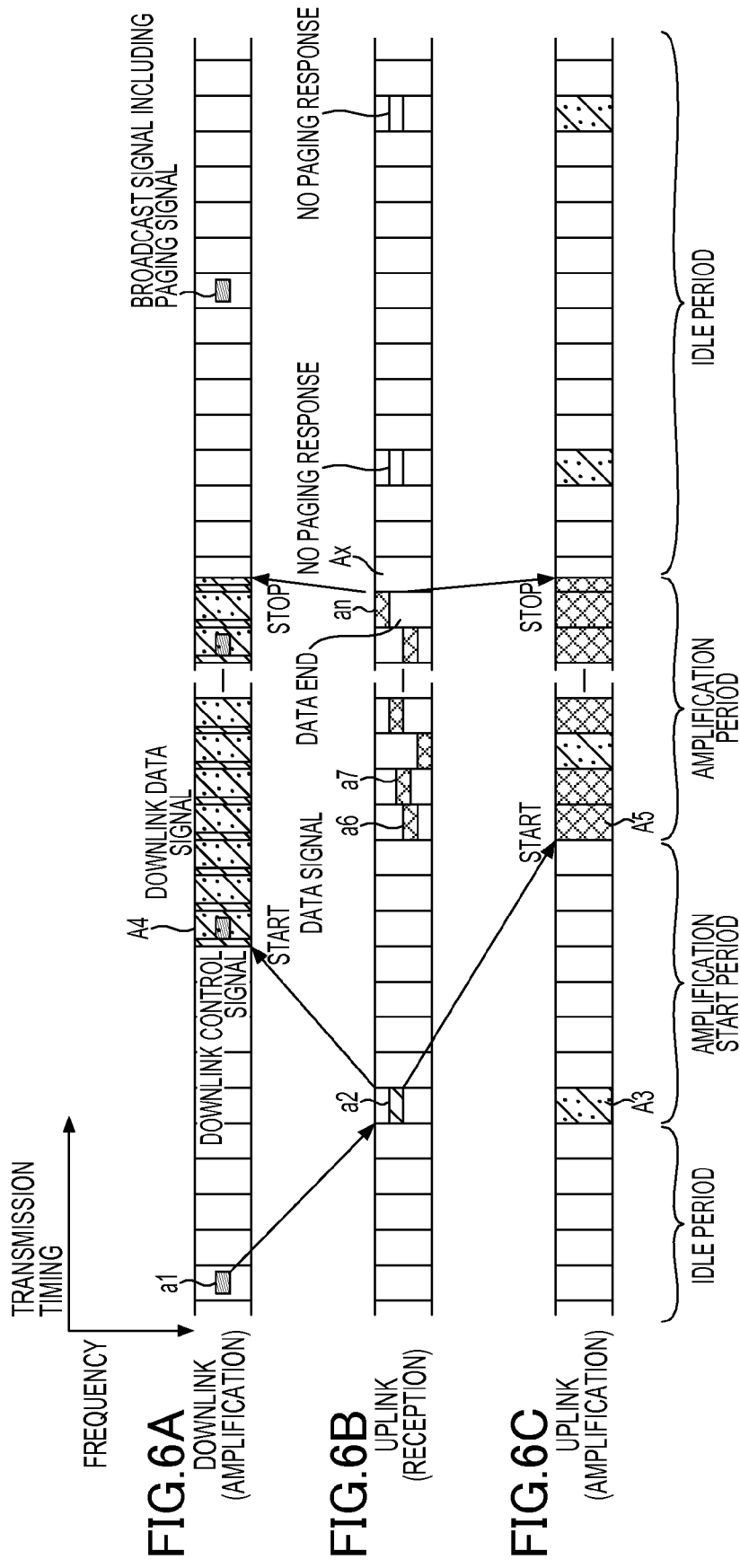
FIGS. 6A to 6C are diagrams illustrating the first embodiment of signal timing charts during the time period from paging response detection until amplification stop.

FIGS. 6A to 6C illustrate the first embodiment of signal timing charts during the time period from paging response detection until amplification stop. FIG. 6A depicts a state where amplification is performed on downlink, FIG. 6B depicts a state where reception is performed on uplink, and FIG. 6C depicts a state where amplification is performed on uplink.

A broadcast signal a1 including a paging signal (indicated by hatching in FIG. 6A) is received by the relay station. In response to this, a paging response signal a2 (indicated by hatching in FIG. 6B) is received by the relay station. In the relay station, a sub-frame A3 (indicated by hatching in FIG. 6C), at the timing of receiving the above-described paging response signal a2, is amplified by the uplink amplifier 30.

In response to the reception of the paging response signal a2, the downlink amplifier 23 starts an amplification from a sub-frame A4 (indicated by hatching in FIG. 6A) at the timing of receiving a subsequent downlink data signal.

Moreover, in response to the reception of the paging response signal a2, the uplink amplifier 30 starts an amplification from a sub-frame A5 (indicated by hatching in FIG. 6C) at the timing of receiving a subsequent uplink data signal. Accordingly, uplink data signals a6 to an (indicated by hatching in FIG. 6B) are amplified and relayed by the relay station.

By comparing FIGS. 6A and 6C, it may be seen that the timing of receiving a subsequent downlink data signal (sub-frame A4) differs from the timing of receiving a subsequent uplink data signal (sub-frame A5). Accordingly, the start timings of amplification on uplink and downlink are different from each other. However, for the purpose of simplifying control, the amplification on uplink may be started at the timing of receiving a downlink data signal.

Here, the time period until just before the paging response signal is received, is referred to as an "idle period". Furthermore, the time period until just before a subsequent downlink data signal and a subsequent uplink data signal are received after the paging response signal has been received, is referred to as an "amplification start period". Processing up to the amplification start period are the same as those illustrated in FIG. 4A to 4C.

A broadcast signal a1 including a paging signal (indicated by hatching in FIG. 6A) is received by the relay station. In response to this, a paging response signal a2 (indicated by hatching in FIG. 6B) is received by the relay station. In the relay station, the sub-frame A3 (indicated by hatching in FIG. 6C), at the timing of receiving the above-described paging response signal a2, is amplified by the uplink amplifier 30.

When no uplink data signal exists in a sub-frame Ax subsequent to the uplink data signal an, illustrated in FIG. 6B, the data and response detection unit 34 notifies the DL amplification control unit 26 and the UL amplification control unit 31 of data detection completion. In response, the downlink amplifier 23 and the uplink amplifier 30 finish the amplification. The period of time from when both the downlink amplifier 23 and the uplink amplifier 30 start the amplification until when they finish the amplification, is referred to as an "amplification period". The period of time after both the downlink amplifier 23 and the uplink amplifier 30 have finished the amplification becomes the "idle period".

<Flowchart of Amplification Control>

Figure 7:
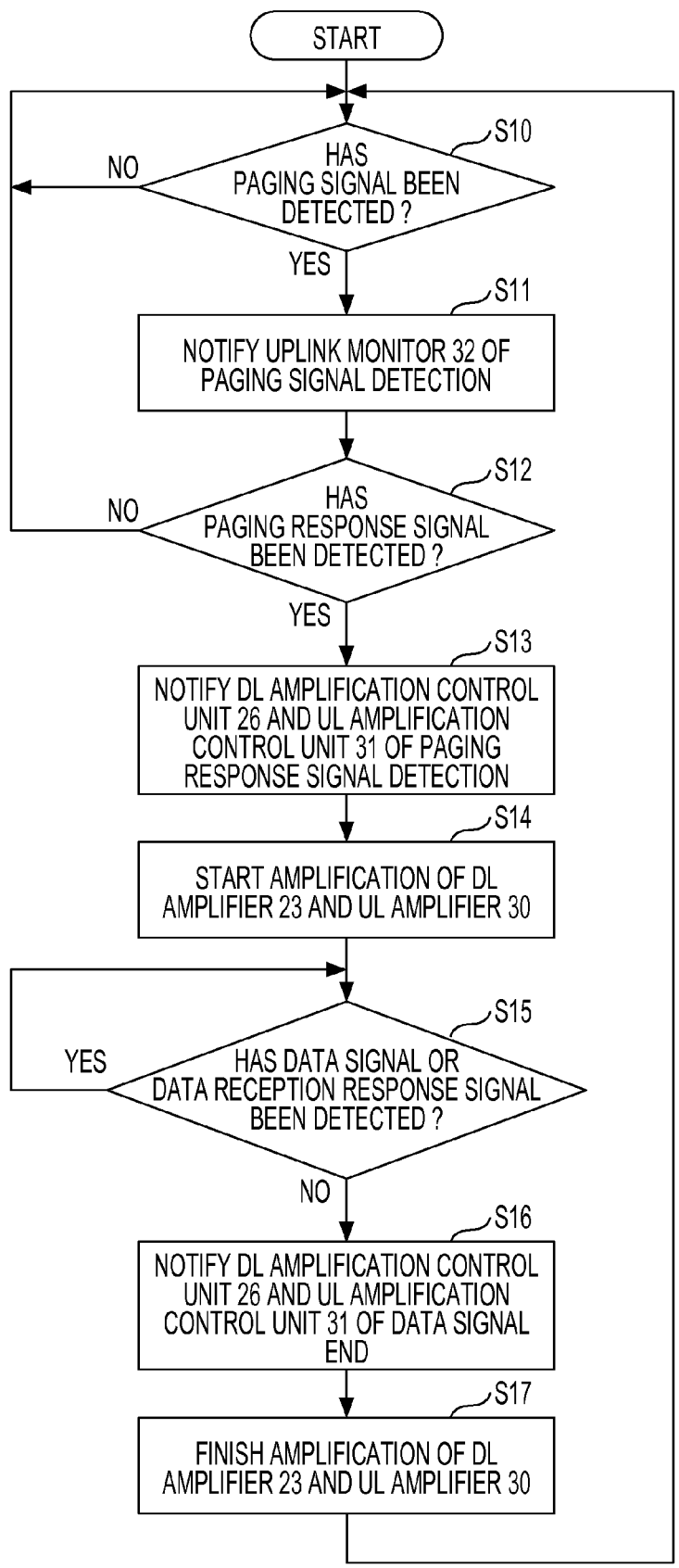
FIG. 7 is a flowchart of an embodiment of an amplification control performed by the relay station.

FIG. 7 illustrates a flowchart of an embodiment of an amplification control performed by the relay station. In FIG. 7, the paging detection unit 25 performs the detection of signals on downlink (step S10). If the paging detection unit 25 has detected a paging signal, the paging detection unit 25 notifies the uplink monitor 32 of the detection of the paging signal (step S11).

The paging response detection unit 33 performs the detection of a response signal on uplink (step S12). If the paging response detection unit 33 has detected the paging response signal, the paging response detection unit 33 notifies the DL amplification control unit 26 and the UL amplification control unit 31 of the detection of the paging response signal (step S13). In response, the DL amplification control unit 26 causes the downlink amplifier 23 to start an amplification, while the UL amplification control unit 31 causes the uplink amplifier 30 to start an amplification (step S14).

On the other hand, if the paging response detection unit 33 does not detect a paging response signal, the process moves from step S12 to step 10.

The data and response detection unit 34 performs the detection of a data signal or a data reception response signal (ACK/NACK) on uplink (step S15). If the data and response detection unit 34 has detected the data signal or the data reception response signal, the data and response detection unit 34 repeats step S15. When the data signal or the data reception response signal is no longer detected, the data and response detection unit 34 notifies the DL amplification control unit 26 and the UL amplification control unit 31 of data signal end (step S16). In response, the DL amplification control unit 26 causes the downlink amplifier 23 to finish the amplification, while the UL amplification control unit 31 causes the uplink amplifier 30 to finish the amplification (step S17). Thereafter, the process moves to step S10 and repeats the processes of steps S10 to S17.

In this way, when no paging response signal is received, the downlink amplifier 23 and the uplink amplifier 30 do not perform amplification. This allows a reduction in power consumption, and enables interference between cells to be reduced. Furthermore, because the present signals may be employed as is, the technique disclosed herein may be applied to existing services to provide a system-independent apparatus, thereby ensuring practical usefulness.

<Configuration of Second Embodiment of Relay Station>

Figure 8:
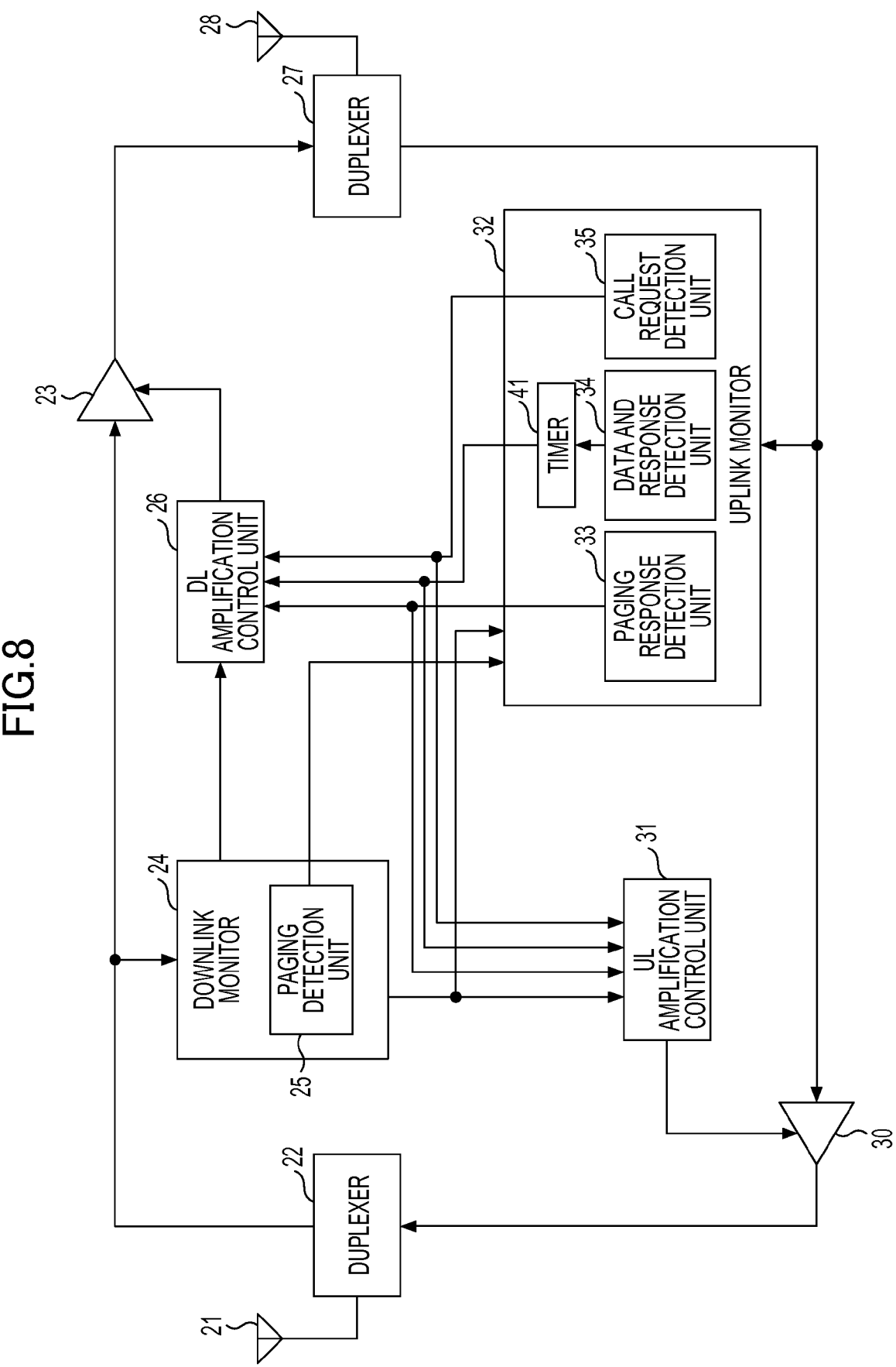
FIG. 8 is a block diagram of a second embodiment of a relay station.

FIG. 8 is a block diagram of a second embodiment of a relay station. FIG. 8 is different from FIG. 3 in that there is provided a timer 41. In FIG. 8, downlink signals from the wireless base transceiver station 10, received by the antenna 21, are supplied to a downlink amplifier 23 and a downlink monitor 24 through a duplexer 22.

The downlink monitor 24 monitors and decodes the downlink signals. Thereby, the downlink monitor 24 recognizes the timing of receiving a broadcast signal including a paging signal and the timing of receiving a paging response signal. The downlink monitor 24 notifies the DL amplification control unit 26 of the timing of receiving of the broadcast signal including the paging signal. The downlink monitor 24 also notifies the UL amplification control unit 31 and the uplink monitor 32 of the timing of receiving the paging response signal.

The downlink monitor 24 includes the paging detection unit 25. The paging detection unit 25 detects the paging signal included in the broadcast signal, and notifies the uplink monitor 32 of the paging detection. Moreover, when the paging signal has been detected, the paging detection unit 25 extracts, from the paging signal, an identifier of a mobile station paged by the pertinent paging signal, and notifies the uplink monitor 32 of the identifier.

The downlink amplifier 23 is placed under the control of the DL amplification control unit 26, and amplifies downlink signals by the RF direct amplification method. The downlink signals having been amplified in the downlink amplifier 23 are transmitted from the antenna 28 through the duplexer 27.

The DL amplification control unit 26 causes the downlink amplifier 23 to perform an amplification at the timing of receiving the broadcast signal including the paging signal. The DL amplification control unit 26, upon receipt of a notification of paging response detection to be described later, causes the downlink amplifier 23 to start an amplification at the timing of receiving a subsequent downlink data signal, and upon receipt of a notification of data detection completion to be described later, causes the downlink amplifier 23 to finish the amplification.

Furthermore, the DL amplification control unit 26, upon receipt of a notification of call request detection to be described later, causes the downlink amplifier 23 to start an amplification at the timing of receiving a subsequent downlink data signal, and upon receipt of a notification of data detection completion to be described later, causes the downlink amplifier 23 to finish the amplification.

Uplink signals from the mobile station, received by the antenna 28, are supplied to the uplink amplifier 30 and the uplink monitor 32 through the duplexer 27.

The uplink monitor 32 monitors and decodes the uplink signals. The uplink monitor 32 includes the paging response detection unit 33, the data and response detection unit 34, and the call request detection unit 35.

The paging response detection unit 33, upon receipt of a notification of paging detection from the paging detection unit 25, detects the paging response signal at the timing of receiving the paging response signal on uplink. When the paging response signal has been detected, the paging response detection unit 33 may extract, from the paging response signal, the identifier of a mobile station that transmitted the pertinent paging response signal. The paging response detection unit 33 notifies the DL amplification control unit 26 and the UL amplification control unit 31 of the paging response detection.

The data and response detection unit 34 detects a data signal or a data reception response signal, such as ACK/NACK, on uplink. When the data signal or the ACK/NACK is no longer detected, the data and response detection unit 34 supplies the timer 41 with a signal indicating detection finish. When the signal indicating detection finish continues for a specified time (for example, on the order of several msec to several sec), the timer 41 notifies the DL amplification control unit 26 and the UL amplification control unit 31 of data detection completion.

The call request detection unit 35 detects a call request using RACH from a mobile station, and notifies the DL amplification control unit 26 and the UL amplification control unit 31 of the call request detection.

The uplink amplifier 30 is placed under the control of the UL amplification control unit 31, and amplifies uplink signals by the RF direct amplification method. The uplink signals having been amplified in the downlink amplifier 23 are transmitted from the antenna 21 through the duplexer 22.

The UL amplification control unit 31 causes the uplink amplifier 30 to perform an amplification at the timing of receiving the paging response signal. The UL amplification control unit 31, upon receipt of a notification of paging response detection, causes the uplink amplifier 30 to start an amplification at the timing of receiving a subsequent uplink data signal, and upon receipt of a notification of data detection completion, causes the uplink amplifier 30 to finish the amplification.

Furthermore, the UL amplification control unit 31, upon receipt of a notification of call request detection, causes the uplink amplifier 30 to start an amplification at the timing of receiving a subsequent uplink data signal, and upon receipt of a notification of data detection completion, causes the uplink amplifier 30 to finish the amplification.

<Signal Timing Chart from Paging Response Detection Until Amplification Stop>

Figure 9:
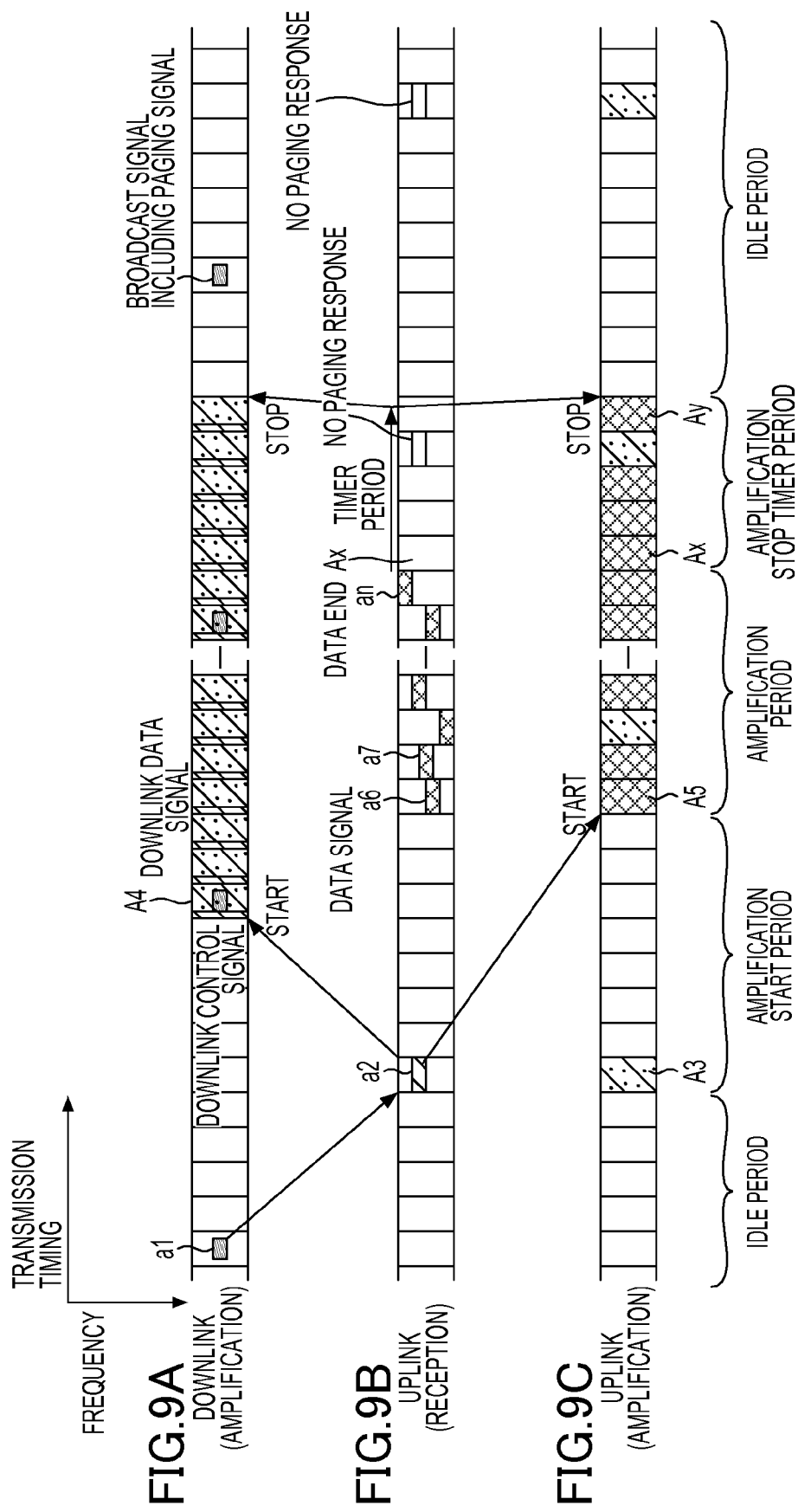
FIGS. 9A to 9C are diagrams illustrating a second embodiment of signal timing charts during the time period from paging response detection until amplification stop.

FIGS. 9A to 9C are diagrams illustrating a second embodiment of signal timing charts during the time period from paging response detection until amplification stop. FIG. 9A depicts a state where amplification is performed on downlink, FIG. 9B depicts a state where reception is performed on uplink, and FIG. 9C depicts a state where amplification is performed on uplink.

A broadcast signal a1 including a paging signal (indicated by hatching in FIG. 9A) is received by the relay station. In response to this, a paging response signal a2 (indicated by hatching in FIG. 9B) is received by the relay station. In the relay station, a sub-frame A3 (indicated by hatching in FIG. 9C), at the timing of receiving the above-described paging response signal a2, is amplified by the uplink amplifier 30.

In response to the reception of the paging response signal a2, the downlink amplifier 23 starts an amplification from a sub-frame A4 (indicated by hatching in FIG. 9A) at the timing of receiving a subsequent downlink data signal.

Moreover, in response to the reception of the paging response signal a2, the uplink amplifier 30 starts an amplification from a sub-frame A5 (indicated by hatching in FIG. 9C) at the timing of receiving a subsequent uplink data signal.

By comparing FIGS. 9A and 9C, it may be seen that the timing of receiving a subsequent downlink data signal (sub-frame A4) differs from the timing of receiving a subsequent uplink data signal (sub-frame A5). Accordingly, the start timings of amplification on uplink and downlink are different from each other. However, for the purpose of simplifying control, the amplification on uplink may be started at the timing of receiving downlink data signal.

Here, the time period until just before the paging response signal is received, is referred to as an "idle period". Furthermore, the time period until just before a subsequent downlink data signal and a subsequent uplink data signal are received after the paging response signal has been received, is referred to as an "amplification start period".

A broadcast signal a1 including a paging signal (indicated by hatching in FIG. 9A) is received by the relay station. In response to this, a paging response signal a2 (indicated by hatching in FIG. 9B) is received by the relay station. In the relay station, the sub-frame A3 (indicated by hatching in FIG. 9C), at the timing of receiving the above-described paging response signal a2, is amplified by the uplink amplifier 30.

When no uplink data signal exists in a sub-frame Ax subsequent to an uplink data signal an, illustrated in FIG. 9B, the data and response detection unit 34 notifies the timer 41 of data detection finish. The period of time from when both the downlink amplifier 23 and the uplink amplifier 30 start amplification until when the downlink amplifier 23 and the uplink amplifier 30 finish the data detection, is referred to as an "amplification period". The timer 41 starts a count processing at the timing of receiving the signal indicating the detection finish, and when no data has been detected while the timer 41 has continued counting until a specified time expires, the timer 41 provides a notification of data detection completion. For the time period from the count start until the data detection completion notification (sub-frames Ax to Ay), both the downlink amplifier 23 and the uplink amplifier 30 perform amplification. The above-described time period (sub-frames Ax to Ay) is referred to as an "amplification stop timer period". Thereafter, the period of time after both the downlink amplifier 23 and the uplink amplifier 30 have completed the amplification, becomes the "idle period".

In this embodiment, even if the data and response detection unit 34 outputs an erroneous signal indicating data detection completion because of low detection accuracy, it is possible to reduce if not prevent the downlink amplifier 23 and the uplink amplifier 30 from erroneously stopping amplification.

<Configuration of Third Embodiment of Relay Station>

Figure 10:
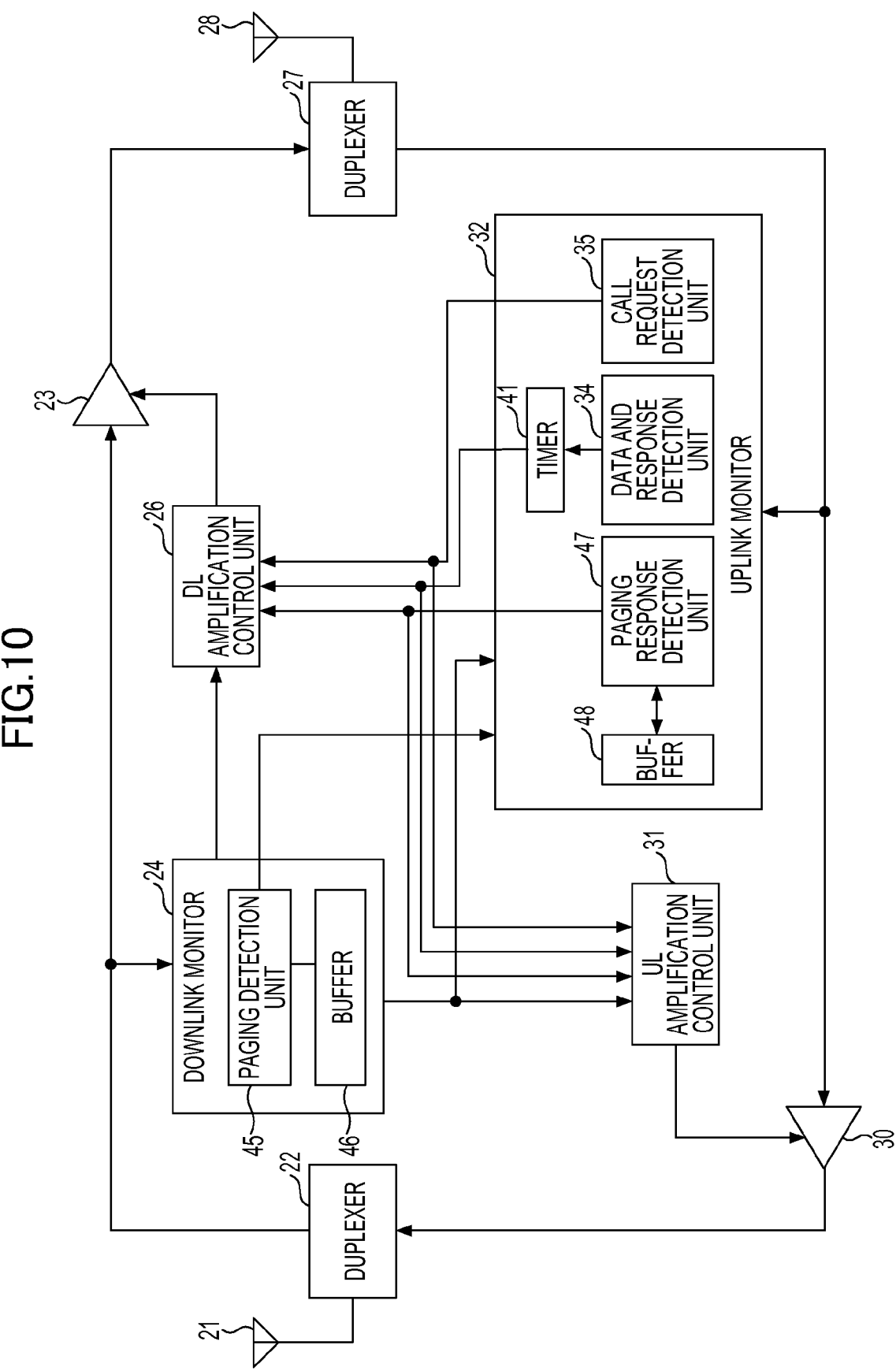
FIG. 10 is a block diagram of a third embodiment of a relay station.

FIG. 10 is a block diagram of a third embodiment of a relay station. FIG. 10 is different from FIG. 8 in that a paging detection unit 45 with a buffer 46 annexed thereto, and a paging response detection unity 47 with a buffer 48 annexed thereto, are provided. In FIG. 10, downlink signals from the wireless base transceiver station 10, received by the antenna 21, are supplied to a downlink amplifier 23 and a downlink monitor 24 through a duplexer 22.

The downlink monitor 24 monitors and decodes the downlink signals. Thereby, the downlink monitor 24 recognizes the timing of receiving a broadcast signal including a paging signal and the timing of receiving a paging response signal. The downlink monitor 24 notifies the DL amplification control unit 26 of the timing of receiving of the broadcast signal including the paging signal. The downlink monitor 24 also notifies the UL amplification control unit 31 and the uplink monitor 32 of the timing of receiving the paging response signal.

The downlink monitor 24 includes the paging detection unit 45. The paging detection unit 45 detects the paging signal included in the broadcast signal. When the paging signal has been detected, the paging detection unit 45 extracts, from the paging signal, the identifier of a mobile station paged by the pertinent paging signal, and holds the identifier in the buffer 46. The paging detection unit 45, having detected the paging signal, notifies the uplink monitor 32 of the paging detection.

The downlink amplifier 45 may be configured to notify the uplink monitor 32 of paging detection when the identifier of a mobile station, extracted from the paging signal, is the same a plurality of times (for example, several times) in succession.

The downlink amplifier 23 is placed under the control of the DL amplification control unit 26, and amplifies downlink signals by the RF direct amplification method. The downlink signals having been amplified in the downlink amplifier 23 are transmitted from the antenna 28 through the duplexer 27.

The DL amplification control unit 26 causes the downlink amplifier 23 to perform an amplification at the timing of receiving the broadcast signal including the paging signal. The DL amplification control unit 26, upon receipt of a notification of paging response detection to be described later, causes the downlink amplifier 23 to start an amplification at the timing of receiving a subsequent downlink data signal, and upon receipt of a notification of data detection completion to be described later, causes the downlink amplifier 23 to finish the amplification.

Furthermore, the DL amplification control unit 26, upon receipt of a notification of call request detection to be described later, causes the downlink amplifier 23 to start an amplification at the timing of receiving a subsequent downlink data signal, and upon receipt of a notification of data detection completion to be described later, causes the downlink amplifier 23 to finish the amplification.

Uplink signals from the mobile station, received by the antenna 28, are supplied to the uplink amplifier 30 and the uplink monitor 32 through the duplexer 27.

The uplink monitor 32 monitors and decodes uplink signals. The uplink monitor 32 includes the paging response detection unit 47, the data and response detection unit 34, and the call request detection unit 35.

The paging response detection unit 47, upon receipt of a notification of paging detection from the paging detection unit 45, detects the paging response signal at the timing of receiving the paging response signal on uplink. When the paging response signal has been detected, the paging response detection unit 47 extracts, from the paging response signal, the identifier of a mobile station that transmitted the pertinent paging response signal, and holds the identifier in the buffer 48. When the identifier of the mobile station, extracted from the paging signal is the same a plurality of times (for example, several times) in succession, the paging response detection unit 47 notifies the DL amplification control unit 26 and the UL amplification control unit 31 of the paging response detection.

The data and response detection unit 34 detects a data signal or a data reception response signal, such as ACK/NACK, on uplink. When the data signal or the ACK/NACK is no longer detected, the data and response detection unit 34 supplies the timer 41 with a signal indicating detection finish. When the signal indicating detection finish continues for a specified time (for example, on the order of several msec to several sec), the timer 41 notifies the DL amplification control unit 26 and the UL amplification control unit 31 of data detection completion.

The call request detection unit 35 detects a call request using RACH from a mobile station, and notifies the 26 and the UL amplification control unit 31 of the call request detection.

The uplink amplifier 30 is placed under the control of the UL amplification control unit 31, and amplifies uplink signals by the RF direct amplification method. The uplink signals having been amplified in the downlink amplifier 23 are transmitted from the antenna 21 through the duplexer 22.

The UL amplification control unit 31 causes the uplink amplifier 30 to perform an amplification at the timing of receiving the paging response signal. The UL amplification control unit 31, upon receipt of a notification of paging response detection, causes the uplink amplifier 30 to start an amplification at the timing of receiving a subsequent uplink data signal, and upon receipt of a notification of data detection completion, causes the uplink amplifier 30 to finish the amplification.

Furthermore, the UL amplification control unit 31, upon receipt of a notification of call request detection, causes the uplink amplifier 30 to start an amplification at the timing of receiving a subsequent uplink data signal, and upon receipt of a notification of data detection completion, causes the uplink amplifier 30 to finish the amplification.

<Signal Timing Chart from Paging Response Detection Until Amplification Stop>

FIGS. 11A to 11C are diagrams illustrating a third embodiment of signal timing charts during the time period from paging response detection until amplification stop. FIG. 11A depicts a state where amplification is performed on downlink, FIG. 11B depicts a state where reception is performed on uplink, and FIG. 11C depicts a state where amplification is performed on uplink.

A broadcast signal a1a including a paging signal (indicated by hatching in FIG. 11A) is received by the relay station. In response to this, a paging response signal a2a (indicated by hatching in FIG. 11B) is received by the relay station. In the relay station, a sub-frame A3a (indicated by hatching in FIG. 11C) at the timing of receiving the above-described paging response signal a2a is amplified by the uplink amplifier 30.

Furthermore, a broadcast signal a1b including a paging signal (indicated by hatching in FIG. 11A) is received by the relay station. In response to this, a paging response signal a2b (indicated by hatching in FIG. 11B) is received by the relay station. In the relay station, a sub-frame A3b (indicated by hatching in FIG. 11C) at the timing of receiving the above-described paging response signal a2b is amplified by the uplink amplifier 30.

In response to the reception of the second paging response signal a2b, the downlink amplifier 23 starts an amplification from a sub-frame A4 (indicated by hatching in FIG. 11A) at the timing of receiving a subsequent downlink data signal.

Moreover, in response to the reception of the paging response signal a2b, the uplink amplifier 30 starts an amplification from a sub-frame A5 (indicated by hatching in FIG. 11C) at the timing of receiving a subsequent uplink data signal. Accordingly, uplink data signals a6 to an (indicated by hatching in FIG. 11B) are amplified and relayed by the relay station.

By comparing FIGS. 11A and 11C, it may be seen that the timing (sub-frame A4) of receiving a subsequent downlink data signal differs from the timing (sub-frame A5) of receiving a subsequent uplink data signal. Accordingly, the start timings of amplification on uplink and downlink are different from each other. However, for the purpose of simplifying control, the amplification on uplink may be started at the timing of receiving downlink data signal.

Here, the time period until just before the first paging response signal is received, is referred to as an "idle period". The time period until just before paging response signals are received a plurality of times (twice in FIG. 11C) after the paging response signal has been received for the first time, is referred to as a "buffer check period". Also, the time period until just before a subsequent downlink data signal and a subsequent uplink data signal are received after the paging response signals has been received a plurality of times, is referred to as a "amplification start period".

Broadcast signals a1a and a1b each including a paging signal (indicated by hatching in FIG. 11A) are received by the relay station. In response, paging response signals a2a and a2b (indicated by hatching in FIG. 11B) are received, respectively, by the relay station. In the relay station, sub-frames A3a and A3b (indicated by hatching in FIG. 11C), at the timing of receiving the above-described paging response signal a2a and a2b, are amplified, respectively, by the uplink amplifier 30.

When no uplink data signal exists in a sub-frame Ax subsequent to the uplink data signal an, illustrated in FIG. 11B, the data and response detection unit 34 notifies the DL amplification control unit 26 and the UL amplification control unit 31 of data detection finish. In response, the downlink amplifier 23 and the uplink amplifier 30 finish the amplification. The period of time from when both the downlink amplifier 23 and the uplink amplifier 30 start amplification until the downlink amplifier 23 and the uplink amplifier 30 finish the data detection, is referred to as an "amplification period".

The timer 41 starts a count processing at the timing of receiving the signal indicating the detection finish, and when no data has been detected while the timer 41 has continued counting until a specified time expires, the timer 41 provides a notification of data detection completion. For the time period from the count start until the data detection completion notification (sub-frames Ax to Ay), both the downlink amplifier 23 and the uplink amplifier 30 perform amplification. The above-described time period (sub-frames Ax to Ay) is referred to as an "amplification stop timer period". Thereafter, the period of time after both the downlink amplifier 23 and the uplink amplifier 30 have completed the amplification, becomes the "idle period".

In this embodiment, even if a paging signal is erroneously received, it is possible to reduce if not prevent the downlink amplifier 23 and the uplink amplifier 30 from erroneously starting amplification, thereby allowing reductions in unnecessary amplification. Meanwhile, although this embodiment is configured to have the timer 41, it may be configured to be free of the timer 41.

In the above-described embodiments, descriptions have been made taking the LTE as an example, but the present invention is also applicable to other wireless communications systems such as the current third generation (3G) wireless communications system and wireless LAN. Thus the present invention is not limited to the above-described embodiments.

In the above-described embodiments, the amplifier 23 is used as an example of a downlink amplifier; the amplifier 30 is used as an example of an uplink amplifier; the paging response detection units 33 and 47 are each used as an example of a paging response signal detection unit; the DL amplification control unit 26 and the UL amplification control unit 31 are each used as an example of an amplification control unit; the downlink monitor 24 is used as an example of a broadcast signal detection unit; and the data and response detection unit 34 is used as an example of a data and response detection unit.

Moreover, in the above-described embodiments, descriptions have been made taking as an example the relay station based on the RF direct amplification method, but the same control as that in the present invention may also be performed using a relay station based on a decode-and-forward scheme (a regenerative relay method), in which a relay processing is performed upon demodulating/decoding and re-encoding/re-modulating a data signal.

According to the present embodiments, it is possible to reduce power consumption.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay station that relays radio signals between a base transceiver station and a mobile station, the relay station comprising:
   a downlink amplifier that amplifies a downlink signal from the base transceiver station to the mobile station;
   an uplink amplifier that amplifies an uplink signal from the mobile station to the base transceiver station;
   a paging response signal detection unit that detects a paging response signal for responding to a paging signal, the paging response signal being transmitted from the mobile station, and the paging signal being transmitted from the base transceiver station for paging the mobile station; and
   an amplification control unit that starts amplification control with respect to the downlink amplifier and the uplink amplifier when the paging response signal has been detected.

2. The relay station according to claim 1, further comprising:
   a broadcast signal detection unit that detects a broadcast signal including the paging signal for paging the mobile station,
   wherein, based on information of the broadcast signal, the amplification control unit activates the downlink amplifier at a timing of receiving the paging signal, and activates the uplink amplifier at a timing of receiving the paging response signal.

3. The relay station according to claim 2, further comprising:
   a data response detection unit that detects one of an uplink data signal and an uplink data reception response signal,
   wherein, when the detection of one of the uplink data signal and the uplink data reception response signal has been completed, the amplification control unit stops amplification of the downlink amplifier and the uplink amplifier.

4. The relay station according to claim 3, further comprising:
   a timing unit that times a time period from after the data response detection unit has completed the detection of one of the uplink data signal and the uplink data reception response signal,
   wherein, when the time period timed by the timing unit exceeds a specified time period, the amplification control unit stops the amplification of the downlink amplifier and the uplink amplifier.

5. The relay station according to claim 3, further comprising:
   a holding unit that holds an identifier of the mobile station that transmits the paging response signal, the identifier being extracted from the paging response signal detected by the paging response signal detection unit,
   wherein, when the identifier of the mobile station that transmitted the paging response signal is the same a plurality of times in succession, the amplification control unit causes the downlink amplifier and the uplink amplifier to start the amplification.

6. A relay method comprising:
   relaying radio signals between a base transceiver station and a mobile station;
   amplifying a downlink signal from the base transceiver station to the mobile station;
   amplifying an uplink signal from the mobile station to the base transceiver station; and
   starting amplification control with respect to the downlink signal and the uplink signal when a paging response signal has been detected, where the paging response signal is transmitted from the mobile station for responding to a paging signal, and the paging signal is transmitted from the base transceiver station for paging the mobile station.

7. The relay method according to claim 6, further comprising:
   detecting a broadcast signal including the paging signal for paging the mobile station; and
   based on broadcast signal information, performing an amplification with respect to the downlink signal at a timing of receiving the paging signal, and performing an amplification with respect to the uplink signal at a timing of receiving the paging response signal.

8. The relay method according to claim 7, further comprising:
   detecting one of an uplink data signal and an uplink data reception response signal; and
   stopping the amplification with respect to the downlink signal and the uplink signal when the detection of one of the uplink data signal and the uplink data reception response signal has been completed.

9. The relay method according to claim 8, further comprising:
   timing a time period from after the detection of the uplink data signal or the uplink data reception response signal has been completed; and
   stopping the amplification with respect to the downlink signal and the uplink signal when the time period exceeds a specified time period.

10. The relay method according to claim 8, further comprising:
holding an identifier of the mobile station that transmitted the paging response signal, the identifier being extracted from the detected paging response signal; and
starting the amplification with respect to the downlink signal and the uplink signal when the identifier of the mobile station that transmitted the paging response signal is the same a plurality of times in succession.

11. A radio communication system comprising:
a first radio communication apparatus;
a second radio communication apparatus; and
a third radio communication apparatus that
relays radio signals between the first radio communication apparatus and the second radio communication apparatus,
amplifies a first radio signal from the first radio communication apparatus to the second radio communication apparatus,
amplifies a second radio signal from the second radio communication apparatus to the first radio communication apparatus, and
starts amplification control with respect to the first radio signal and the second radio signal when a paging response signal has been detected, where the paging response signal is transmitted from the second radio communication apparatus for responding to a paging signal, and the paging signal is transmitted from the first radio communication apparatus for paging the second radio communication apparatus.

* * * * *